2,777,550

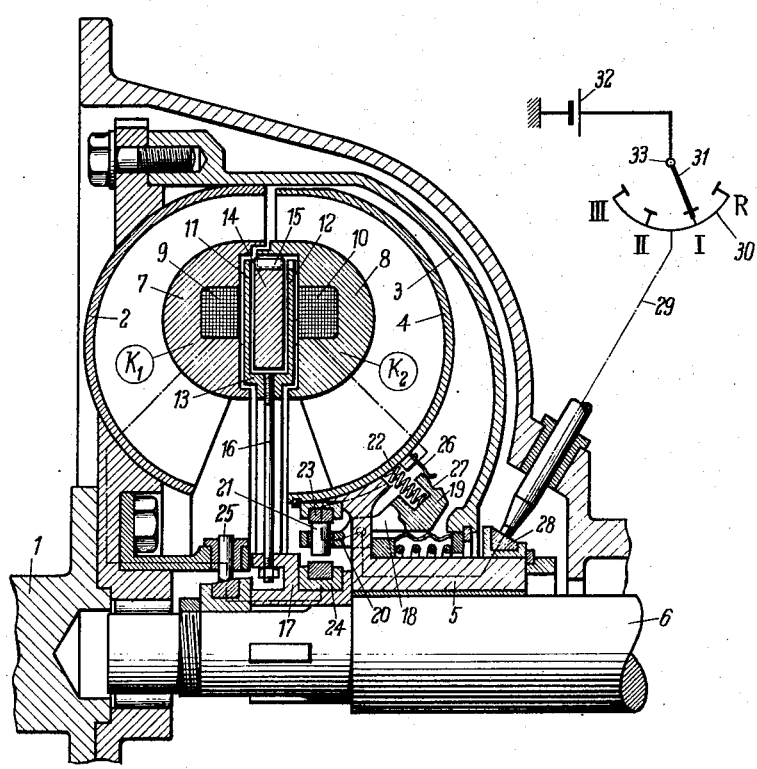

FLUID COUPLING WITH ELECTROMAGNETIC CLUTCH

Hans Joachim M. Förster, Harthausen a. F., Kreis Esslingen (Neckar), Germany, assignor to Daimler-Benz Aktiengesellschaft, Stuttgart-Unterturkheim, Germany Application October 26, 1950, Serial No. 192,238

Claims priority, application Germany October 29, 1949

14 Claims. (Cl. 192—3.2)

The invention is concerning a clutching device including a hydrodynamic clutch or a torque converter, especially for driving mechanisms including transmissions such as used in motor vehicles.

One object of the invention is to obtain an improved efficiency of such clutching device, especially by reducing the loss of energy caused by the slip of such clutches.

A further object of the invention is the provision of means for shifting the hydro-dynamic clutches cooperating with additional clutches.

One feature of the invention therefore consists in the fact that the hydro-dynamic clutch cooperates with two other adjoined clutches (auxiliary clutches), one of which is serving as locking clutch for the direct transfer of the drive between the driven member and the driving member 22 of the hydro-dynamic clutch and the other as disconnecting clutch, in such a way that by disengaging the same an interruption of the drive through the hydro-dynamic clutch, respectively a complete interruption of the drive can be effected. Preferably, the disconnecting clutch is arranged between the driven member of the hydro-dynamic clutch and the drive shaft of the device.

The efficiency of a driving mechanism working with a hydro-dynamic clutch can be essentially improved by the use of such clutches. The disconnecting clutch for instance, is engaged only while starting and in the lower speed range of the engine, and always when for other reasons a drive through the hydro-dynamic clutch is to be effected, while under normal working conditions, for instance after the engine has reached a certain speed, such as secondary or driving speed, the locking clutch is engaged. According to a further feature of the invention both clutches are disengaged when changing to a complete interruption of the drive. A drive involving the relatively low efficiency characteristic of the hydro-dynamic clutch can therefore be reduced to more or less short intervals so that the loss of efficiency can be kept low.

A further feature of the invention provides an automatic shifting of the additional clutches, for instance dependent upon the speed of the engine, respectively the speed of one part of the clutch. According to a further feature of the invention the shifting is especially effected in such a way that when the speed has exceeded a certain limit, preferably that of the secondary part of the hydro-dynamic clutch, the disconnecting clutch is disengaged and the locking clutch engaged. For this purpose an electric snap switch under centrifugal force may be used. According to a further feature of the invention the operation of the clutches is effected dependent upon the position of the gear shift member, for inst. in such a way that only with fully engaged gears the clutches can be engaged or disengaged, and that in an intermediate position of the gear changing member on the other hand, they are automatically disengaged, for inst. by the interruption of the electric current, in such a way that during the shifting operation the power transfer is completely interrupted.

Further objects of the invention are concerning the construction of the additional clutches in the form of electro-magnetic clutches, a suitable space-saving arrangement of additional clutches within the hydro-dynamic clutch, the use of the inner annular parts of the hydro-dynamic clutch as part of the electro-magnetic clutches and the construction of the clutch-disks in the form of spokes, blades or the like in such a way that they enable the fluid for the hydro-dynamic clutch to pass.

Further objects and features of the invention are to be seen from the following description and design of an embodiment of the invention:

The figure in the drawing illustrates a sectional view of the invention.

With the shaft 1 driven by the engine the primary member 2 of a hydro-dynamic clutch, as well as the cup-shaped casing member 3 of the clutch are firmly connected. By the driving member of the clutch, i. e. the primary member 2, the driven member of the clutch, i. e. the secondary member 4 of the hydrodynamic clutch is hydraulically driven, whose hub 5 is rotarily mounted on the driven shaft 6, which may be the main shaft of a transmission. By the driven shaft of the transmission the axle of a motor vehicle is driven.

The central annular space confined on its outside by the clutch canals in the primary and secondary member of the hydro-dynamic clutch is formed by the iron cores 7 resp. 8 of the electro-magnetic auxiliary clutches $K_1$ and $K_2$ with the energizing coils 9 and 10. Here the auxiliary clutch $K_1$ serves as locking clutch, the clutch $K_2$ as disconnecting clutch. The movable parts 11 and 12 of these clutches are formed as annular lamellas with a common support 13 in such a way that such lamellas, since they have a U-shaped cross section, include an iron core 14 closing the magnetic flux. The iron core is at its outer circumference provided with gear teeth 15 engaging corresponding gear teeth of the iron core 8 in such a way that it can freely move between the two lamellas 11 and 12 with an axial clearance. By wire spokes 16 suitably arranged under tension and tangentially in the way of bicycle spokes, the lamella support 13 is connected to the hub 17 which is keyed unmovably on the shaft 6. The spokes can yield slightly elastically in the direction of the axle and in circumferential direction.

One effect of the tangential elasticity is that, when the auxiliary clutch or clutches are disengaged, for instance by interrupting the electric current, the return of the lamella or lamellas to their mean position is promoted. The tangential elasticity especially replaces a torsion shock absorber.

The additional clutches arranged within the hydro-dynamic clutch suitably rotate completely within the fluid of the hydro-dynamic clutch. In order to overcome hereby the shifting resistance, the clutches—which besides can be of a very small size—can be a little over-dimensioned. Or, by connecting the central annular space with any pressureless space, the additional clutches can also be kept free from oil to a certain degree. But generally the running in oil will be preferable, because the inevitable remanent magnetism can be made harmless by the lubrication. By additional connections with the clutch canals this effect can be increased. The coupling set can be operated with a constant filling or be connected to a fluid circulation system.

On the secondary member 4 of the hydro-dynamic clutch, or in the hub 5 of this member a lever 18 is arranged whose one arm is formed as a centrifugal weight 19 and whose other arm 20 bears a contact pin 21. This is alternatively under the effect of the spring 22 pressed against a counter-contact 23 arranged on the secondary member 4 of the hydro-dynamic clutch and in conducting connection with the energizing coil 10 of the disconnecting clutch $K_2$ or is held, under the effect of the centrifugal force, against a contact 24 at the hub 17 which is electrically connected for instance through a sliding contact 25 to the energizing coil 9 of the locking clutch $K_1$ within the primary member 2 of the hydro-dynamic clutch.

A spring 26 is engaged in a groove 27 of the centrifugal weight 19, when this has moved to the outside against the effect of the spring 22, when the speed of the secondary clutch member exceeds a certain limit.

The conduction of electric current to a contact pin 21 is effected through a sliding contact 28; through a line 29 this is connected to a contact bar 30, on which different contact members, for instance for the reverse gear R and I, II, III for the different forward gears of the transmission are arranged.

A contact lever 31 connected to the gear shifting lever conducts the current produced in the electric source 32 through the shifting shaft 33 to the different contact members and from there to the contact pin 21, as long as one of the gears of the transmission is fully engaged. But the circuit is cut, if the contact lever 31 is in an intermediate position while the shifting from one gear to the other is being effected. Even after a gear is engaged the gear shifting lever can, for instance, make an additional stroke during which the electric circuit is closed.

The clutch works in the following way:

Let it be assumed that the first gear of the transmission is engaged, according to the position of the lever 31 indicated on the drawing. When the engine is idling or at starting speed, the centrifugal weight 19 is pressed inward by the spring 22 in such a way that the contact pin 21 is bearing against the contact 23. Therefore, the current can flow from 32 through I and the contact 23 to the coil 10 of the disconnecting clutch $K_2$ in such a way that by this clutch the secondary member 4 of the hydro-dynamic clutch is firmly engaged with the transmission shaft 6 through the armature lamella 12.

The coil 9 of the clutch $K_1$ on the other hand is cut off from the circuit. Therefore, power is transmitted from the engine or from shaft 1 through the hydro-dynamic clutch 2, 4 to shaft 6, the primary member 2 of the hydrodynamic clutch driving the secondary member 4 in the usual way. Hereby the connection of the lamella supports 13 with the hub 17 by the spokes 16 enables the fluid serving to transfer the torque (for instance oil) to pass through the spoke wheel without a notable resistance.

When the speed of the drive shaft 6 and therefore also that of the secondary member of the hydro-dynamic clutch is increased beyond a certain value, the centrifugal force of the centrifugal weight 19 overcomes the counter-effect of the spring 22, by which the lever 18 is shifted to its outer position preferably by a sudden movement. The spring 26 hereby engages the groove 27. The flow of current is interrupted at 23 and the circuit between the contact pin 21 and the contact 24 is closed; the disconnecting clutch $K_2$ being disengaged and the locking clutch $K_1$ being engaged. Therefore the primary member 2 of the hydro-dynamic clutch is directly connected with the drive shaft 6 by the locking clutch $K_1$, while the secondary member 4 of the hydro-dynamic clutch is taken along by the gearing 15.

When the speed of the shaft 6 is reduced again, the locking clutch $K_1$ will be disengaged and the disconnecting clutch $K_2$ will be engaged, when the speed drops below a certain minimum, which is preferably lower than the speed at which the shifting to a higher gear has been effected. This effect can be obtained by the spring 26 or by a special device producing a hysteresis effect. A detent recess for the spring 26 can be provided, which keeps the centrifugal weight 19 in its normal position, as shown on the drawing.

The same manner of working as described is obtained wherever one of the other gears, for instance the reverse gear R or one of the forward gears I to III, is fully engaged. While this is the case, either the disconnecting clutch $K_2$ (at lower speeds) or the locking clutch $K_1$ (at higher speeds) is engaged.

When a gear is shifting moving for instance the contact lever 31 engaged with the gear shifting lever from I to II the circuit is interrupted. Therefore also the auxiliary clutch in action (according to the momentary speed), generally the locking clutch $K_1$, is disengaged and the direct drive between shaft 1 and shaft 6 as well as the drive through the hydro-dynamic clutch is interrupted. Therefore the shifting from one gear to another can easily be effected.

When the driver has throttled down the engine at the same time, the speed of the engine and therefore also of the secondary member of the hydro-dynamic clutch has been reduced by the interruption of the power transfer during the shifting. By the snap lever 18 the contact connection at contact 23 is restored, and at the moment when a new gear is shifted, i. e. as soon as the contact lever 31 touches the contact part for the new gear (for instance II), the energizing coil 10 of the disconnecting clutch $K_2$ is connected up again. This effects a driving connection between the engine and the vehicle through the hydro-dynamic clutch. The secondary member of the clutch is accelerated again, until a new shifting from the disconnecting clutch $K_2$ to the locking clutch $K_1$ takes place. In suitable cases the engagement of the locking clutch, after the gear-shifting has been effected, can take place with a temporary delay, for instance by preventing for a short time the shifting of the snap lever 18 by a suitable means, temporarily dependent upon the transfer of current at the shifting lever 31.

A "hydro-dynamic clutch" in the sense of the invention is, in suitable cases, also a hydro-dynamic torque converter (hydro-dynamic transmission).

What I claim is:

1. In a fluid drive, the combination comprising a driving shaft, a hydrodynamic device composed of a primary member permanently connected with said driving shaft and of a secondary member adapted to be impelled by said primary member, said primary and secondary members defining an annular space therebetween, a driven shaft, a pair of auxiliary clutches disposed in said annular space, one of said clutches being adapted to connect and to disconnect said driven shaft to and from said primary member and the other one of said auxiliary clutches being adapted to connect and to disconnect said driven shaft to and from said secondary member, actuating means adapted to cause alternative engagement of one or the other of said auxiliary clutches, and a spring-urged member controlling said actuating means, said spring-urged member being mounted on said hydrodynamic device and movable in response to the rotary speed thereof to cause said actuating means, when said speed exceeds a certain limit, to connect said driven shaft to said primary member and to cause said actuating means, when said speed drops below a certain limit, to disconnect said driven shaft from said primary member.

2. In a fluid drive, the combination comprising a hydrodynamic device composed of a primary member and of a secondary member adapted to be impelled by said primary member, a driven shaft, a pair of auxiliary clutches, the first one being adapted to connect and to disconnect said driven shaft to and from said primary member and the second one being adapted to connect and to disconnect said driven shaft to and from said secondary member, a movable element co-operatively co-ordinated to said auxiliary clutches and adapted to assume a first position in which it engages said first one of said auxiliary clutches, a second position in which it engages the second one of said auxiliary clutches, and a central position in which it engages neither of said auxiliary clutches, actuating means adapted to actuate said movable member in either direction, and speed-responsive means mounted on said hydrodynamic device and adapted to control said actuating means so as to cause one or the other of said auxiliary clutches to be engaged depending on the rotary speed of said hydrodynamic device.

3. In a fluid drive, the combination comprising a hydrodynamic device composed of a primary member and of a secondary member adapted to be impelled by said primary member, a driven shaft, a friction clutch element mounted on said shaft for common rotation therewith and located between said members normally disengaged therefrom, an armature co-operatively connected with said friction element, and electromagnetic actuating means mounted on said members and adapted to attract said armature towards one or the other of said members, thereby causing said armature to engage said friction element with one or the other of said members clutching said driven shaft thereto.

4. The combination claimed in claim 3, in which said members of said hydrodynamic device have adjacent annular cores constituting fluid guide rings, and in which said electromagnetic actuating means are formed by electrical coils provided within said fluid guide rings.

5. In a fluid drive, the combination comprising a hydrodynamic device composed of two relatively rotatable annular adjoining casing sections enclosing adjacent fluid guide rings and vanes holding said fluid guide rings in spaced relationship to said casing sections inside thereof, annular pockets being provided in the opposed faces of said adjacent rings, electrical energizing coils in said pockets, an annular armature located between said rings, a driven shaft, and friction clutch disks located between said armature and said rings and connected to said driven shaft for common rotation therewith.

6. The combination claimed in claim 5, in which said armature is permanently connected with one of said casing sections for common rotation therewith.

7. The combination claimed in claim 5, in which said annular armature co-axially surrounds said driven shaft, and in which said friction clutch disks are confined to the space between said fluid guide rings and are connected with one another, wire spokes being provided to connect said friction clutch disks to said driven shaft for common rotation therewith and for resilient relative axial displacement.

8. In a fluid drive, the combination comprising a hydrodynamic impeller device, a driven shaft, an electromagnetic friction clutch adapted to connect said device to said driven shaft and including an energizing coil, a movable switch element adapted to control said coil and capable of assuming a plurality of active positions in which it energizes said electromagnetic clutch and a plurality of intermediate inactive positions, said switch being adapted to be connected with a gear shift lever so as to de-energize said coil in transitional positions of the gear shift lever during shifting operations, and a centrifugal switch mounted on said impeller device and adapted, when the rotary speed of same drops below a certain limit, to de-energize said coil.

9. In a fluid drive, the combination comprising a hydrodynamic device composed of a primary member and of a secondary member impelled by said primary member, a driven shaft, a pair of electromagnetic clutches, the first one of said clutches being adapted to connect and to disconnect said driven shaft to and from said primary member and the second one of said clutches being adapted to connect and to disconnect said driven shaft from said secondary member, a centrifugal switch mounted on said impeller device and adapted, when the speed of same exceeds a certain limit, to energize said first one of said auxiliary clutches and, when said speed drops below a certain limit lower than that first mentioned limit, adapted to de-energize said first one of said clutches, and a circuit breaker adapted to control said electromagnetic clutch and including a movable switch element capable of assuming a plurality of active positions in which it energizes said second one of said clutches and a plurality of intermediate inactive positions, said switch element being adapted for connection with a gear shift lever so as to de-energize said second one of said clutches in transitional positions of the gear shift lever during shifting operations.

10. In a fluid drive, the combination comprising a hydrodynamic device composed of a primary member and of a secondary member adapted to be impelled by said primary member, a driven shaft, two auxiliary electromagnetic clutches, one of said clutches being adapted to connect said driven shaft to said primary member and the other one being adapted to connect said driven shaft to said secondary member, a centrifugal switch mounted on said hydrodynamic device and being adapted, in response to the rotary speed thereof, to alternatively energize one or the other of said auxiliary electromagnetic clutches, and an electrical switch operable by a gear shift lever to disable said centrifugal switch.

11. In a fluid drive, the combination comprising a driving shaft, a hydrodynamic device including a primary member permanently connected with said driving shaft and a secondary member adapted to be impelled by said primary member, a driven shaft, a pair of auxiliary clutches, one of said clutches being adapted to connect and to disconnect said driven shaft to and from said primary member and the other one of said auxiliary clutches being adapted to connect and to disconnect said driven shaft to and from said secondary member, electromagnetic means for engaging each of said auxiliary clutches, switching means operative to cause alternative energizing of said electromagnetic means, and a spring-controlled member operatively connected to said switching means for actuating the latter, said spring-controlled member being movably mounted on said hydrodynamic device and moving in response to the rotary speed of the latter to cause said switching means, when the rotary speed exceeds a predetermined limit, to effect energization of the electromagnetic means associated with said one auxiliary clutch for connecting said driven shaft to said primary member and to cause said switching means, when said rotary speed drops below a predetermined limit, to effect de-energization of the electromagnetic means associated with said one auxiliary clutch for disconnecting said driven shaft from said primary member.

12. In a fluid drive, the combination comprising a driving shaft, a hydrodynamic device including a primary member permanently connected with said driving shaft and a secondary member adapted to be impelled by said primary member, said primary and secondary members defining a central annular space therebetween, a driven shaft, and two alternately operative auxiliary clutches disposed within said annular space, one of said auxiliary clutches being operative to connect said driven shaft to said primary member and the other of said auxiliary clutches being operative to connect said driven shaft to said secondary member.

13. In a fluid drive, the combination comprising a driving shaft, a hydrodynamic device composed of a primary member permanently connected with said driving shaft and of a secondary member adapted to be impelled by said primary member, said primary and secondary members defining an annular space therebetween, a driven shaft, a pair of auxiliary clutches disposed in said annular space, one of said clutches being adapted to connect and to disconnect said driven shaft to and from said primary member and the other of said auxiliary clutches being adapted to connect and disconnect said driven shaft to and from said secondary member, and actuating means operative to cause alternative engagement of one of said auxiliary clutches.

14. In a fluid drive, the combination comprising a driving shaft, a hydrodynamic device including a primary member permanently connected with said driving shaft and a secondary member adapted to be impelled by said primary member, said primary and secondary members defining an annular space therebetween, fluid guide rings in said annular space provided with a cavity therebetween, a driven shaft, a clutch including a clutch member independent from said primary and said secondary members within said cavity, means connecting said clutch member with one of said shafts through said annular space independently from said members, and operating means to engage one of said members independently from the other one of said members with said one shaft by said clutch member.

References Cited in the file of this patent

UNITED STATES PATENTS

| | | |
|---|---|---|
| 2,120,734 | Cotal | June 14, 1938 |
| 2,184,606 | De Lavaud | Dec. 26, 1939 |
| 2,267,334 | Keller | Dec. 23, 1941 |
| 2,289,019 | Jessen | July 7, 1942 |
| 2,302,714 | Pollard | Nov. 24, 1942 |
| 2,320,116 | Avila | May 25, 1943 |
| 2,332,593 | Nutt et al. | Oct. 26, 1943 |
| 2,334,394 | Dodge | Nov. 16, 1943 |
| 2,375,440 | Roche | May 8, 1945 |
| 2,377,009 | Heyer | May 29, 1945 |
| 2,642,168 | Black et al. | June 16, 1953 |

FOREIGN PATENTS

| | | |
|---|---|---|
| 599,765 | Germany | July 9, 1934 |